(12) United States Patent
Rai

(10) Patent No.: US 8,280,181 B2
(45) Date of Patent: Oct. 2, 2012

(54) EFFICIENT FILTERING OF IMAGE DATA

(75) Inventor: Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 1327 days.

(21) Appl. No.: 11/955,609

(22) Filed: Dec. 13, 2007

(65) Prior Publication Data

US 2009/0154824 A1 Jun. 18, 2009

(51) Int. Cl.
*G06K 9/40* (2006.01)
(52) U.S. Cl. .......... 382/260; 382/261; 382/266
(58) Field of Classification Search .......... 382/199, 382/260, 261, 266, 303, 240; 348/209.99; 396/52; 358/2.26, 3.27
See application file for complete search history.

(56) References Cited

U.S. PATENT DOCUMENTS

| | | | |
|---|---|---|---|
| 6,348,929 B1 | 2/2002 | Acharya et al. | |
| 6,671,418 B2 | 12/2003 | Rengakuji et al. | |
| 6,756,990 B2 | 6/2004 | Koller | |
| 6,920,358 B2 | 7/2005 | Greenberg et al. | |
| 7,136,536 B2 | 11/2006 | Andersson et al. | |
| 7,162,099 B2 | 1/2007 | Ojo et al. | |
| 7,170,529 B2 | 1/2007 | Chang | |
| 7,245,776 B2 * | 7/2007 | Matsuura | 382/240 |
| 7,529,474 B2 * | 5/2009 | Hatanaka et al. | 396/52 |
| 8,055,075 B1 * | 11/2011 | Tamura | 382/199 |
| 2003/0133028 A1 | 7/2003 | Morinaka et al. | |
| 2004/0208352 A1 | 10/2004 | Neuberger et al. | |
| 2004/0234157 A1 | 11/2004 | Forman et al. | |
| 2006/0140498 A1 | 6/2006 | Kudo et al. | |
| 2006/0188147 A1 | 8/2006 | Rai et al. | |
| 2007/0035653 A1 | 2/2007 | Hong et al. | |

FOREIGN PATENT DOCUMENTS

| | | |
|---|---|---|
| GB | 2325131 | 11/1998 |
| GB | 2377333 | 1/2003 |
| JP | 2001245290 | 9/2001 |
| WO | 03081904 A1 | 10/2003 |

* cited by examiner

*Primary Examiner* — Anh Hong Do

(57) ABSTRACT

Systems and methods for efficiently applying a filter to image data are disclosed. For efficiently applying the filter, a filter type including coefficient values for each pixel in the image data is identified. A sub-matrix corresponding to the size of the filter is selected in the image data. The sub-matrix includes the plurality of pixels that can be represented in a $2^N$ form. Each coefficient value is a number that is in a $2^M$ form. The system calculates an average value of multiplications of pixel values with the corresponding coefficient values of each of the plurality of pixels. The multiplication of a pixel value and corresponding coefficient value is calculated by shifting a binary representation of the pixel value M bits, and a division to calculate the average value is performed by shifting a binary representation of a sum of the multiplications N bits. The average value is then applied to the center pixel. The process is repeated by selecting a new sub-matrix until the end of the image data is reached.

20 Claims, 10 Drawing Sheets

305 ↘   304 ↙

| x  | 2  | 3  | x  | 5  | x  | 7  | x  | 9  |
|----|----|----|----|----|----|----|----|----|
| 10 | 11 | 12 | 13 | 14 | 15 | 16 | 17 | 18 |
| 19 | x  | 21 | 22 | 23 | 24 | 25 | 26 | x  |
| x  | 29 | 30 | 31 | 32 | 33 | 34 | 35 | 36 |
| 37 | 38 | 39 | 40 | 41 | 42 | 43 | 44 | x  |
| 46 | 47 | 48 | 49 | 50 | 51 | 52 | 53 | x  |
| x  | 56 | 57 | 58 | 59 | 60 | 61 | x  | 63 |
| 64 | x  | 66 | 67 | x  | 69 | 70 | 71 | 72 |
| 73 | 74 | 75 | x  | 77 | 78 | x  | 80 | x  |

Figure 4B

| x  | 2  | 3  | x  | 5  | 6  | x  | 8  | 9  |
|----|----|----|----|----|----|----|----|----|
| 10 | 11 | 12 | 13 | 14 | 15 | 16 | 17 | x  |
| 19 | 20 | 21 | 22 | 23 | 24 | 25 | 26 | 27 |
| 28 | 29 | 30 | 31 | 32 | 33 | 34 | 35 | x  |
| 37 | 38 | 39 | 40 | 41 | 42 | 43 | 44 | 45 |
| x  | 47 | 48 | 49 | 50 | 51 | 52 | 53 | x  |
| 55 | 56 | 57 | 58 | 59 | 60 | 61 | 62 | 63 |
| x  | 65 | 66 | 67 | 68 | 69 | 70 | 71 | x  |
| 73 | 74 | 75 | 76 | x  | 78 | x  | 80 | 81 |

Figure 4C

Multiplication

Multiply by X (where X can be represented in $2^N$ form) = Left Shift N bits

Figure 4D

Division

Divide by X (where X can be represented in $2^N$ form) = Right Shift N bits

Figure 4E

EFFICIENT FILTERING OF IMAGE DATA

CROSS REFERENCE TO RELATED APPLICATIONS

This application is related to U.S. patent application Ser. No. 11/763,972, filed on Jun. 15, 2007, and entitled "Method and Apparatus for Providing a Variable Blur," the disclosure of this application is incorporated herein by reference in its entirety for all purposes.

BACKGROUND

The embodiments described herein generally relate to providing efficient hardware filters for manipulating image data.

Many digital cameras, especially the lower quality digital cameras associated with cell phones or other portable electronic devices, do not produce very clear images of the captured pictures. One of the reasons digital images are often of a low quality is because the cameras use very small lenses due to physical space constraints on the portable devices. Smaller lenses inherently allow less light into the lens than larger ones. Less light results in a larger noise to signal ratio which produces a low quality image. The lack of a flash for the camera also introduces noise into the image data. Other factors for poor image quality include the digital sampling rate of the camera, the use of inexpensive lenses to keep the cost of the device low, and the limited computing resources of the portable devices.

Filters are commonly used in the manipulation of image data. However, applying larger filters to speed up the manipulation of image data requires complex and resource intensive hardware. Hence, in the devices having limited resources, such application of large filters becomes impractical to avoid slow response time.

It is within this context that embodiments of the invention arise.

SUMMARY

Broadly speaking, the present invention fills these needs by providing efficient hardware filters to enable application of larger filters to manipulate image data to improve image quality without compromising device efficiency and response time. It will be obvious, however, to one skilled in the art, that the present invention may be practiced without some or all of these specific details. In other instances, well known process operations have not been described in detail in order not to unnecessarily obscure the present invention.

In one embodiment, a method for efficiently applying a filter to image data is disclosed. For efficiently applying the filter, a filter type including coefficient values for each pixel in the image data is identified. A sub-matrix corresponding to the size of the filter is selected in the image data. The sub-matrix includes the plurality of pixels that can be represented in a $2^N$ form. Each coefficient value is a number that can be represented in a $2^M$ form. The system calculates an average value of multiplications of pixel values with the corresponding coefficient values of each of the plurality of pixels. The multiplication of a pixel value and corresponding coefficient value is calculated by shifting a binary representation of the pixel value M bits, and a division to calculate the average value is performed by shifting a binary representation of a sum of the multiplications by N bits. This calculated average value is then applied to the center pixel. The process is repeated by selecting a new sub-matrix until the end of the image data is reached.

In another embodiment, a filter circuit for filtering image data is disclosed. The filter circuit includes a memory for storing a portion of the image data and coefficient logic configured to determine a filter coefficient to be applied to a reference pixel in a sub-matrix of the image data. The coefficient logic includes a register array to store a plurality of filter coefficients, and the register array further includes data representing a filter type associated with each register in the register array. The filter coefficients are numbers that can be represented in a $2^M$ form, in one embodiment. The filter circuit further includes First In First Out (FIFO) logic to retrieve portions of the image data from the memory and filter logic configured to calculate an average of multiplications of pixel values and corresponding coefficients. The filter logic includes sum logic to calculate a sum of numbers, multiplication logic to multiply a pixel value by a corresponding coefficient value through a bit shift operation, and division logic to divide a sum of the multiplications by a number of pixels in the sub-matrix. The number of pixels in the sub-matrix is capable of being represented in a $2^N$ form.

In yet another embodiment, a method of efficiently applying a filter to image data is disclosed. The method includes identifying a filter having a filter size to filter the image data, and reducing a number of pixel positions within the filter, where the number of pixel positions are selected from different concentric rings of the filter. The method includes applying the filter with the reduced number of pixel positions to the image data. The number of pixel positions is selected to reduce the filter size to a number that can be represented in $2^N$ form to enable the use of bit shift operations for multiplication and division.

The advantages of the present invention are numerous. Most notably, the apparatus and methods described herein provide efficient application of larger filters without compromising with the efficiency, power consumption, and speed of operations in devices having limited computing resources.

Other aspects and advantages of the embodiments of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

FIGS. 4B and 4C illustrate an exemplary modification of a filter pixel matrix by removing one or more pixels from different regions in accordance with one embodiment of the invention.

FIGS. 4D and 4E illustrate methods of multiplication and division using bit shift operations for hardware efficient filters in accordance with one embodiment of the invention.

Figure 1:
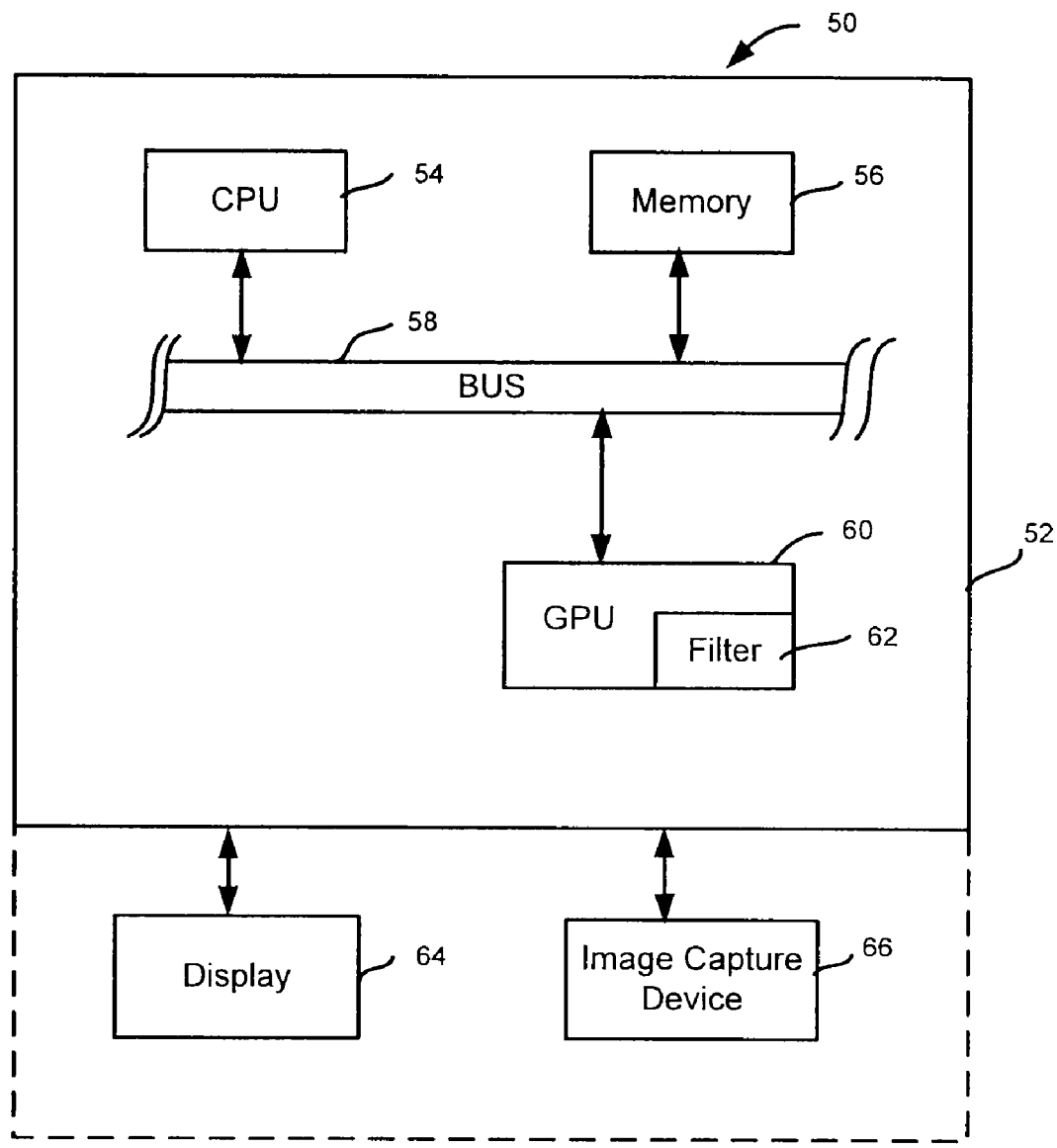
FIG. 1 illustrates a block diagram of a system for providing efficient hardware filters, in accordance with one embodiment of the invention.

The figures are provided in order to provide a thorough understanding of the present invention. The figures should not be construed as limiting the breath of the invention in any manner.

DETAILED DESCRIPTION

An invention is described for methods, apparatuses, and systems for improving image data captured through a computing device having limited resources. It will be obvious, however, to one skilled in the art, that the present invention may be practiced without some or all of these specific details. In other instances, well known process operations have not been described in detail in order not to unnecessarily obscure the present invention.

Filters are commonly used in the manipulation of image data. However, because the logic required for larger size filters, these larger filters are not commonly used in mobile devices having limited resources. For example, for a 3×3 filter it is necessary to incorporate 9 multipliers, 8 adders and one divider in the logic circuit. It may be noted that divider logic is relatively large. As the filter grows to a 9×9 filter, 81 multipliers, 80 adders and one divider is needed, and so on. In one embodiment, the multipliers and the divider can be eliminated by slightly modifying the filter. For example, a 17×17 filter can be modified by selectively removing 32 pixel positions from different regions of the image data to reduce the number of pixels in the 17×17 matrix from 289 to 256. As 256 can be represented in $2^N$ form, a shift function (described in details in FIG. 4D and FIG. 4E) can be implemented for the multiplication and division. The 32 pixel positions eliminated can be selected partially from the outer ring of pixels of the matrix and the remainder from an inner ring (e.g. 16×16 ring in 17×17 matrix in one embodiment). In this example, the resulting filter (17×17) will still provide better coverage than a 16×16 filter as the outer ring is partially intact.

The embodiments described herein provide methods, apparatuses, and systems for efficient filtering of image data to improve the efficiency and display quality of a captured image. In one embodiment, a captured image is analyzed to determine which regions of the image are detail or transition portions, e.g., and edge. Once analyzed, the image quality can be improved by applying filtering techniques to specific regions. The filtering techniques described herein reduce the noise associated with the image data. The reduction of noise in the image is adaptively performed in a manner that prevents unnecessary distorting of the image, which may result in a loss of detail. The embodiments described herein may be integrated in a portable device having a camera.

In one implementation, a pixel matrix is initially analyzed to determine if a reference pixel of the pixel matrix should be filtered, i.e., blurred (or any other type of filtering). It should be appreciated that the matrix and sub-matrix sizes provided herein are exemplary, and that alternative matrix sizes larger or smaller may be chosen. In addition, it is not necessary that the matrix be square, as different numbers of rows and columns may be used. In another embodiment, the filter can be adaptively applied. That is, some regions may be filtered at one level, other regions may be filtered at a different level, and/or some regions may not be filtered at all. As will be explained in more detail below, a sub-matrix in the pixel matrix is selected. The value of each pixel is multiplied by a coefficient value for the respective pixel. An average is calculated by adding all these multiplied values and dividing the summed up value by the number of pixels involved in the calculation of the summation. This average value is then assigned to the center pixel of the sub-matrix. A new sub-matrix is now chosen and the process of calculating average and assigning the average value to the center pixel is repeated. The process continues until all pixels in the captured image are filtered.

Embodiments described herein provide efficient methods of calculating averages of pixel values, thereby enabling a use of less resource intensive hardware circuitry to implement filters. The methods of calculating averages and applying filters as described herein also provides comparatively faster application of filters, thereby enabling the real time application of the filtering techniques on streaming videos. With this overview in mind, the following figures will illustrate example structure and functionality of the fabrication of the self-aligned local interconnects.

FIG. 1 is a block diagram that illustrates a system 50 for providing a efficient filtering that may be used to implement the invention. As shown in FIG. 1, a computing unit 52 includes a Central Processing Unit (CPU) 54, a memory 56, a bus 58, and a Graphical Processor Unit (GPU) 60. The GPU 60 includes filter logic 62 for implementing filtering of the image data. Bus 58 provides a communication route through which data can travel between CPU 54, Memory 56, and GPU 60. Bus 58 may be implemented by any means that allow the functional units of computing unit 52 to communicate with each other. Computing unit 52 may be implemented on a Personal Computer (PC), a cell phone, a web tablet, a personal PC, a Personal Digital Assistant (PDA), a laptop, etc., each of which may include image capture capability. Although the foregoing are examples, it should be appreciated that any computing device, either portable or non-portable, may be used to implement the invention, even though the embodiments described herein are described with reference to a limited computing resource and battery powered device.

Computing unit 52 is in communication with image capture device 66. It should be noted that image capture device 66 may be incorporated into a charged coupled device (CCD) or complementary metal oxide semiconductor (CMOS) chip. Computing unit 52 receives image data from the image capture device 66. The image capture device 66 may be a standalone unit, or may be integrated into the computing unit 52. Display 64 may be a computer monitor, a Liquid Crystal Display (LCD), or a Thin Film Transistor display of computing device 52.

Figure 2:
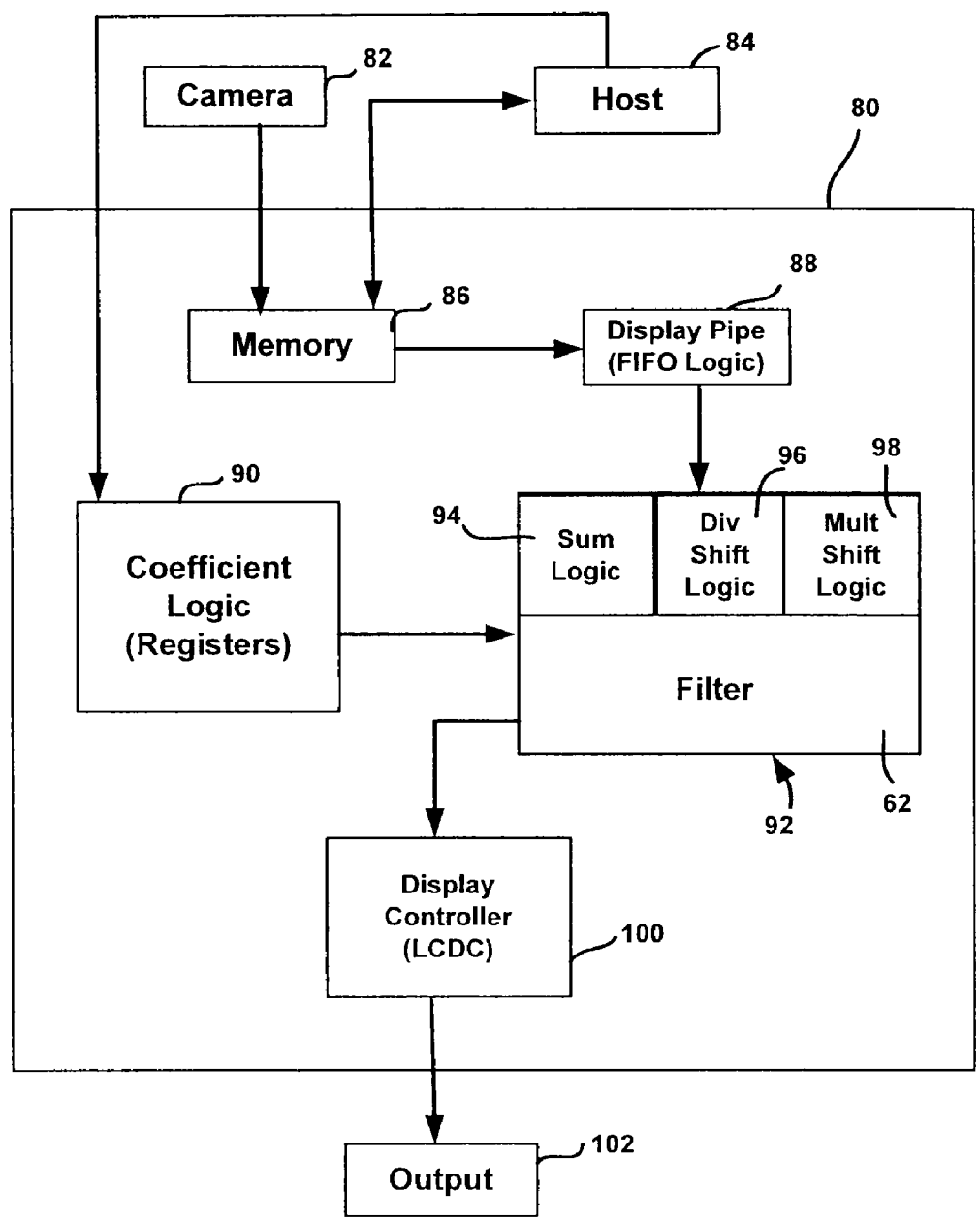
FIG. 2 illustrates a block diagram illustrating components of the filter unit, in accordance with one embodiment of the present invention.

FIG. 2 illustrates the internal structure of the GPU 60. The GPU 60 includes memory 86 to store image data from the camera 82. The memory 86 is also coupled to the host 84. In one embodiment, the host 84 can use the memory 86 for managing and manipulation of the storage of the image data. Coefficient Logic 90 includes a set of registers for storing coefficient values for various types of filters. The host 84 provides an interface for selecting and applying selected ones of the coefficient values of the registers to the image data. The selected coefficient values are provided to the filter 62, which in turn uses the values to calculate multiplication through the Multiply Shift Logic 98. The filter 62 receives the pixel values of pixels in the image data from the memory 86 through the display pipe (First In First Out or FIFO logic) 88. In one embodiment display pipe 88 is a FIFO buffer. The filter 62 selects a sub-matrix of pixels from the image data, multiplies each pixel value with a corresponding coefficient and then adds up all multiplied values in one embodiment, in one embodiment. In another embodiment, the center or reference pixel or pixels are not included in the multiplication calculations. Through the Division Shift Logic 96, the filter 62 calculates the average by dividing the sum of all multiplied values by the number of pixels in the sub-matrix, in one embodiment. In another embodiment, the center or reference pixel or pixels are not included in the calculation of the average. For example, in the embodiment in which the center pixel or pixels are not included in the calculations, in a pixel matrix, the filter 92 may select a 9×9 sub-matrix, multiply pixel values of all but one center pixel in the sub-matrix by corresponding coefficient values, then calculate an average by dividing the sum by eight. In another embodiment, a sub-matrix consisting of an even number of rows and columns can be selected. In this embodiment, since there will be no actual center pixel, four pixels in the center can be selected as the center pixels or center region. In yet another embodiment, any pixel in the sub-matrix may be chosen to be the center pixel as long as this position is maintained consistently for future filter calculations.

Once the average is calculated, the value of the center pixel (or pixels in case of an even sub-matrix) is set to this average value. The process of calculating the average and changing the value of the center pixel to this calculated average continues by selecting another sub-matrix. In one embodiment, a new sub-matrix is selected by moving the center or reference pixel one pixel to the right relative to the center or reference pixel of the previously selected sub-matrix. Once the row end is reached, filter 62 starts the sub-matrix selection process, in one embodiment, one pixel down from the beginning of previous starting sub-matrix. In essence, the path is similar to a rasterization pattern in this embodiment. The filtered image data is outputted to the output device 102 through a Display Controller 100.

Figure 3:
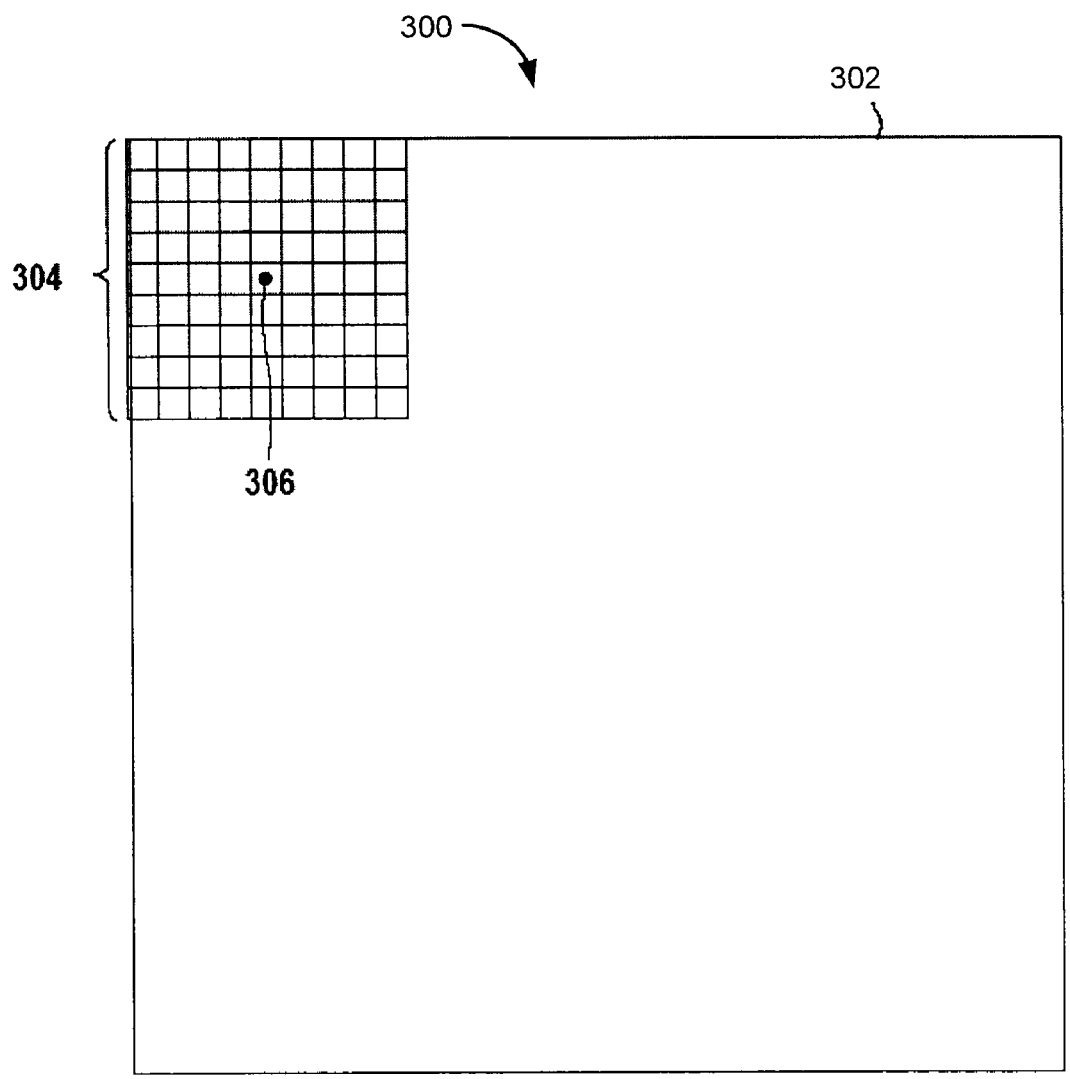
FIG. 3 illustrates a simplified schematic diagram illustrating a view of a captured image with a corresponding pixel matrix, in accordance with one embodiment of the invention.

FIG. 3 is a simplified schematic diagram of view 300 of a pixel matrix of a captured image 302 with an exemplary sub-matrix 304, in accordance with one embodiment of the invention. In one embodiment, sub-matrix 304 is a 9×9 matrix, i.e., the matrix is composed of 9 pixels across (a row of pixels) and 9 pixels down (a column of pixels). It should be appreciated that the matrix and sub-matrix sizes provided herein are exemplary, and that alternative matrix sizes larger or smaller may be chosen. In addition, it is not necessary that the matrix be square, as different numbers of rows and columns may be used In this embodiment, the center pixel 306 is the actual center of the 9×9 matrix, i.e., the center is 5 rows across and 5 rows down from a top left hand corner of the matrix. Although the reference pixel is the actual center pixel of the 9×9 pixel matrix, this is not meant to be limiting. If there are an even number of rows and columns which form the pixel matrix there will not be an actual geometric center. In that case, when the matrix is made up of an even number of pixels (or even if there are an odd number of pixels as in the 9×9 example), any pixel in the matrix may be chosen as the reference pixel 306, as long as this pixel location is chosen consistently for each successive matrix for the blur calculation. Once center pixel 306 is identified, the average value of the multiplication of the value of each pixel and its corresponding coefficient is calculated for all the remaining pixel values in the 9×9 sub-matrix 304 and the value of the center pixel 306 is set to this calculated average value.

Figure 4A:
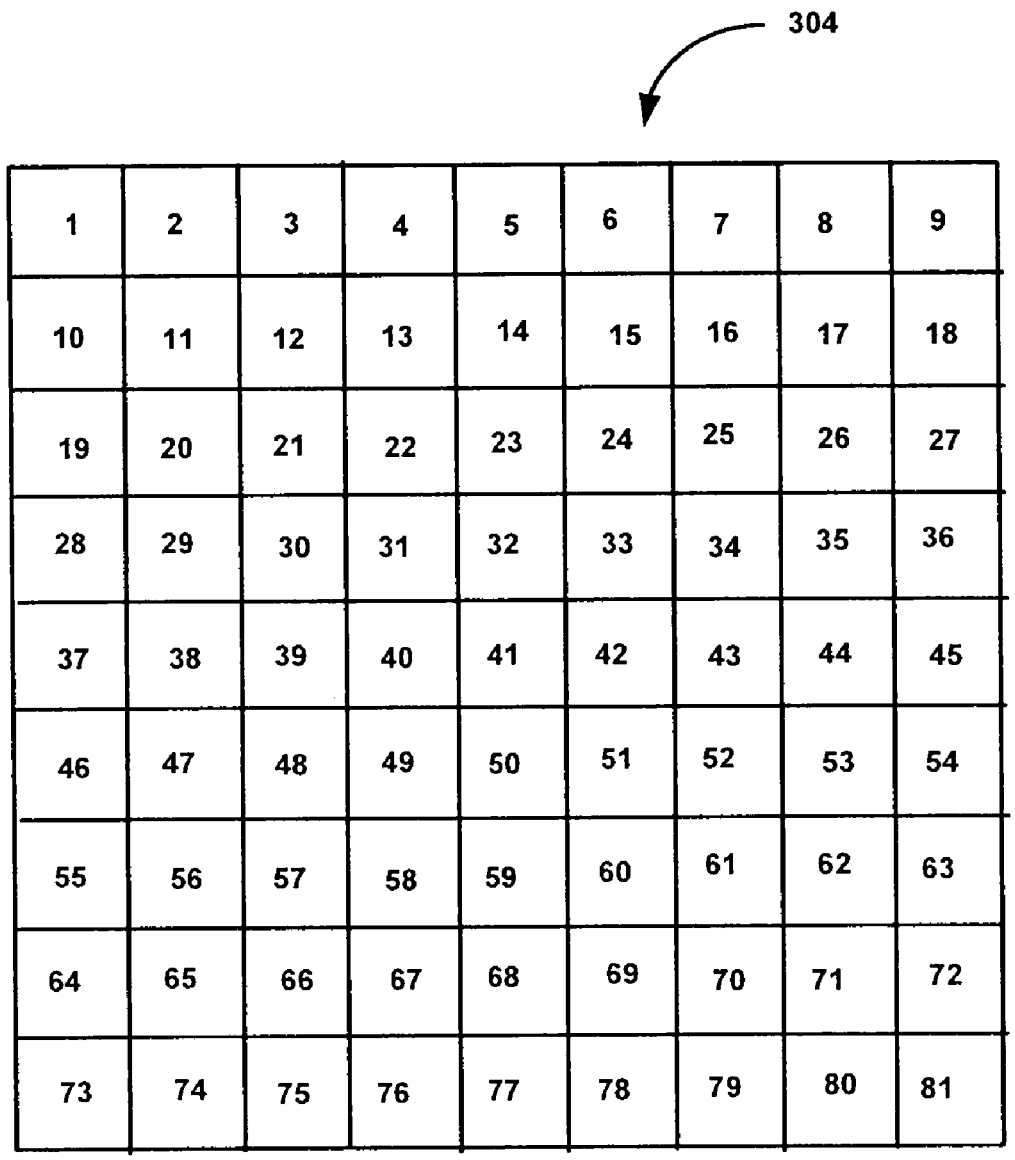
FIG. 4A illustrates a simplified schematic diagram illustrating a view containing a 9×9 pixel matrix of a captured image, in accordance with one embodiment of the invention.

FIG. 4A illustrates the 9×9 sub-matrix 304 for providing better understanding of the processing of averaging and changing value of the center pixel to remove noise from the image data and to apply the selected filter uniformly. The exemplary pixel sub-matrix 304 includes 81 pixels. As apparent, pixel number 41 is the center pixel. Each of these pixels has a pixel value and the coefficient register provides a pre-selected coefficient value (depending upon the type of filter to be applied to the image data) for each of these pixels. In one embodiment, the pixel value of each pixel is multiplied by its corresponding coefficient value. In this embodiment, the result of each of these multiplications is then added and divided by 81 to calculate the average. In another embodiment, the center pixel may be excluded from multiplication and averaging calculations. The value of the pixel number 41 (center pixel) is set to the calculated average value. Next the 9×9 sub-matrix shifts one pixel to the right of the previous 9×9 sub-matrix and the same above process of averaging and changing the value of the center pixel is repeated. It may be noted that the next sub-matrix may be selected in the pixel matrix by moving the sub-matrix to the right one or more pixels depending upon the desired granularity and processing speed.

Once the end of the row is reached, the next 9×9 sub-matrix is selected from one or more pixels below the beginning of the first sub-matrix. This way, all pixels in the pixel matrix 302 are normalized (i.e., pixels that may have abnormal pixel values due to noise are brought to parity with their neighboring pixels) except the pixels on the outer periphery of the pixel matrix 302. However, the outer periphery of pixel matrix 302 may be filtered as described further below.

FIG. 4B illustrates an exemplary method of selectively removing some of the pixels so that for example a 9×9 filter can be used to filter the image data. Since a 9×9 pixel matrix includes 81 pixels, methods of multiplication and division using bit shift operations as illustrated in FIGS. 4D and 4E cannot be employed. In order for the division operation using the bit shift operation to work, the divisor (number of pixels in this case) needs to be able to be represented in $2^N$ form. In one embodiment, one or more pixels are removed (i.e. not considered in the calculations) from the border and near border regions of the filter pixel matrix. FIG. 4B illustrates removed pixels by a letter "x" 305. Hence, in this example, 16 pixels have been removed, leaving 65 pixels to be used in the calculations. Pixel number 41 is the center or reference pixel, which is not counted in the divisor for the averaging calculation. Hence, only 64 pixels (i.e., $2^8$) are left for the calculation of the average of the multiplications of pixel values with corresponding coefficient values of all remaining pixels except the center or reference pixel.

In another embodiment as illustrated in FIG. 4C, the center or reference pixel is formed including a number of pixels 303. In this example, six pixels are chosen as reference or center pixel approximately in the middle of the filter pixel matrix. Hence, only 11 more pixels need to be removed from different regions of the filter pixel matrix 304 to bring the total number of pixels to be used as divisor in the averaging calculations to 64 (i.e., $2^8$). It may be noted that in other embodiments, the pixels can be removed selectively from different regions.

It may be noted that the removal of the pixels will not affect the filter quality substantially because an average of a relatively large number of pixel values is being calculated and applied to center or reference pixel(s). Hence, removing a few of the pixels from the calculation will not substantially alter the final value that is applied to the center or reference pixel. On the other hand, benefits of such selective removal are enormous. Among others, benefits include simplified and efficient circuitry due to the use of shift operations for multiplication and division, enhanced calculation speed, low resource consumption, etc.

FIG. 4D illustrates a method of multiplication of binary numbers. A binary number can be multiplied by a number that can be represented in $2^N$ form by simply shifting the binary number N bits to the left. Hence, the binary number 01110101 can be multiplied by 4 simply by shifting the number 01110101 two bits to the left or adding two zeros at the least significant bit (LSB) side, i.e., 0111010100.

Similarly, FIG. 4E illustrates a method of division of binary numbers. A binary number can be divided by a number that can be represented in $2^N$ form by simply shifting the binary number N bits to the right. Hence, the binary number 01110101 can be divided by 4 simply by shifting the number 01110101 two bits to the right, i.e., 00011101.

Advantages of using a shift to multiply and divide is that conventional implementation of multiplication and division is relatively complicated, resources intensive, and time consuming compared to implementation of shifting operation. Hence, accomplishing multiplication and division through shift operations provides resource conservation and efficiency in types of devices where conservation of resources is necessary (for example, in mobile devices, battery life can be extended by resource conservation). Implementing shifting operations is also relatively simple; therefore the filter circuitry of the device can also be simplified due to the use of a shifting operation for multiplication and division. Furthermore, since shift operations are relatively fast, the filter can be applied to streaming video image data frames in real time using limited resources of a battery operated device.

Figure 5A:
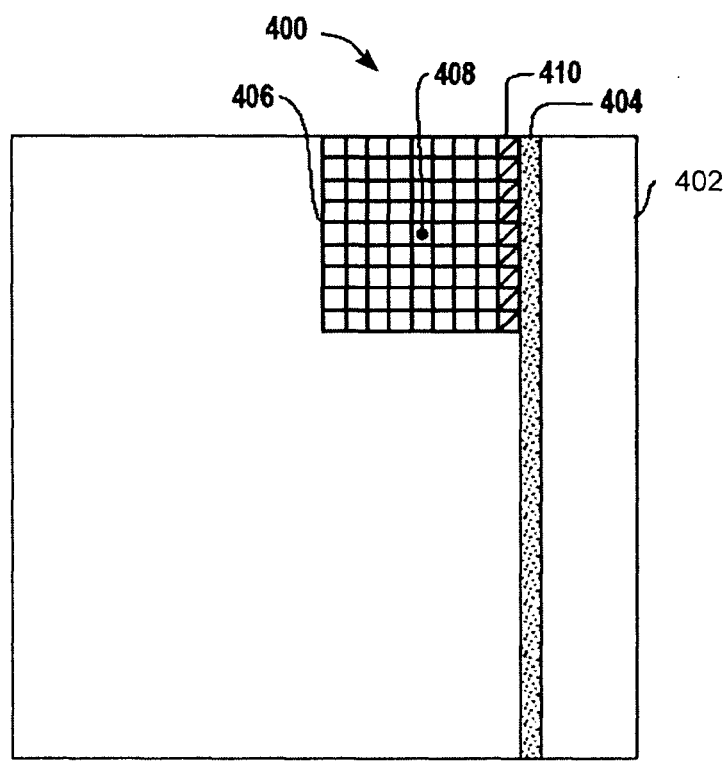
FIGS. 5A illustrates a simplified schematic diagram illustrating a view of a pixel matrix which has not yet entered an image area containing any detail, in accordance with one embodiment of the present invention.

FIG. 5A is a simplified schematic diagram illustrating view 400 of a pixel matrix 406 which has not yet entered an edge area, or transition area 404, in accordance with one embodiment of the present invention. FIG. 5A has a 9×9 sub-matrix 406 with a pixel center 408. In this embodiment the far right column of 9 pixels 410, as well as the remaining pixels within the 9×9 pixel matrix, is completely composed of an area that lacks detail or transitions, such as a background area of the image 402. The 9×9 matrix has not yet entered a transition area 404 of image 402. That is, the actual pixel values should be similar in value for each of the pixels within matrix 406. It should be appreciated that a transition area is any area where the image has an edge or some detail. One skilled in the art will appreciate that this technique works for both black and white images, as well as for colored images because the technique relies on a comparison of pixel values. Pixels representing black, white, or different colored pixels all have different pixel values, and the technique described in the various embodiments herein is applicable to different color formats.

Figure 5B:
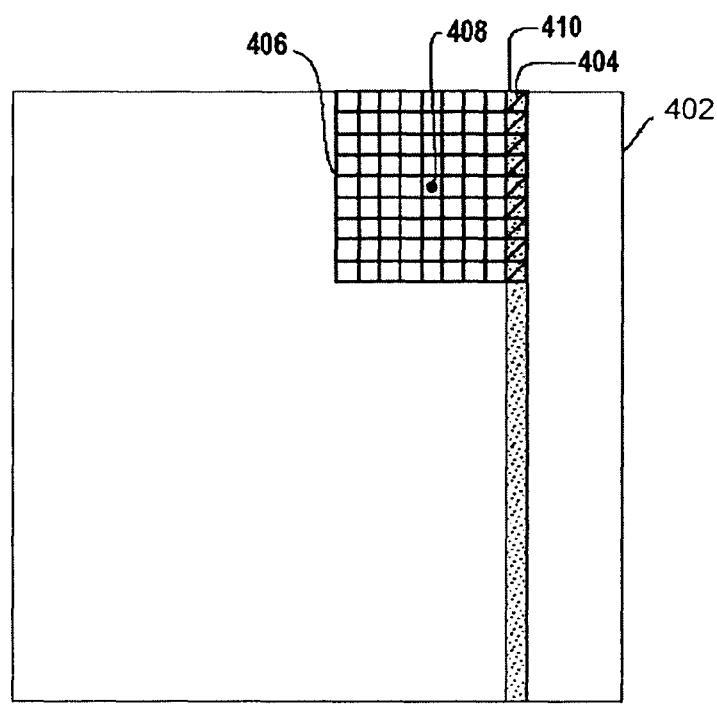
FIG. 5B illustrates a simplified schematic diagram illustrating a view of a pixel matrix which has entered an image area containing some detail, in accordance with one embodiment of the present invention.

FIG. 5B is a 9×9 sub-matrix 406 with a pixel center 408. The far right column of 9 pixels 410 has entered a transition area 404 of image 402. An average pixel value calculated by multiplying the coefficient for all pixels except the center pixel 408 in the 9×9 pixel matrix 406 would be relatively higher or lower (depending upon the background) compared to the average from FIG. 5A. In this embodiment, therefore, applying the average to the center pixel would allow graduated transitioning of the image depending on how much detail, i.e., differences in pixel values there was in the matrix area of the image. It should be appreciated that the process described above proceeds across the rows of the image advancing one column at a time from left to right and then returning to the left hand side and moving down one row, and so on, in a rasterization pattern. In addition, in one embodiment, in order to account for the corner pixels for filtering when the sub-matrix is a 9×9 matrix and the reference pixel is the center pixel, the four rows under the center pixel can be translated to correspond to the rows above the first row. That is, the bottom four rows can be given row numbers −1 through −4, and the same can be done with the last four columns to essentially translate the 9×9 sub-matrix so that the center is the first pixel in the top left hand corner. Thus, a peripheral region of the image data can be filtered through this embodiment. Alternatively, a border may be applied to around the image data.

Figure 6A:
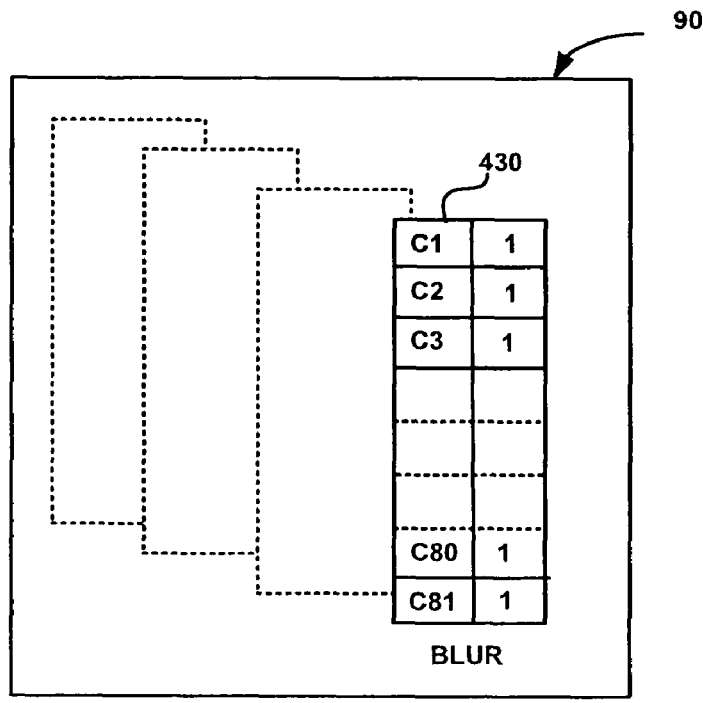
FIG. 6A illustrates a representation of the coefficient logic and exemplary values of coefficients for different filters stored in registers, in which each cell in the filter pixel matrix may have a different coefficient value, in accordance with one embodiment of the present invention.

FIG. 6A illustrates the structure of the Coefficient Logic 90 in one exemplary embodiment. In this embodiment, the registers 430 in the Coefficient Logic 90 store a coefficient value for each pixel in the matrix (9×9 matrix in this example). The registers 430 would have multiple value sets for various different types of filters in one embodiment. In another embodiment, a user of the device may select a desired register (based on the desired type of filtering, such as blur) through the host. In another embodiment, the host may preset filtering based on the modes of operations such as automatic, night shoot, etc. Storing coefficient values for each pixel in the matrix enables variable filtering of the pixel matrix, i.e., different pixel values may be weighted differently. For example, where the center pixel is considered, the center pixel may be given a higher weight or coefficient as compared to the remainder of pixel values. Of course, numerous other weighting schemes may be applied.

Figure 6B:
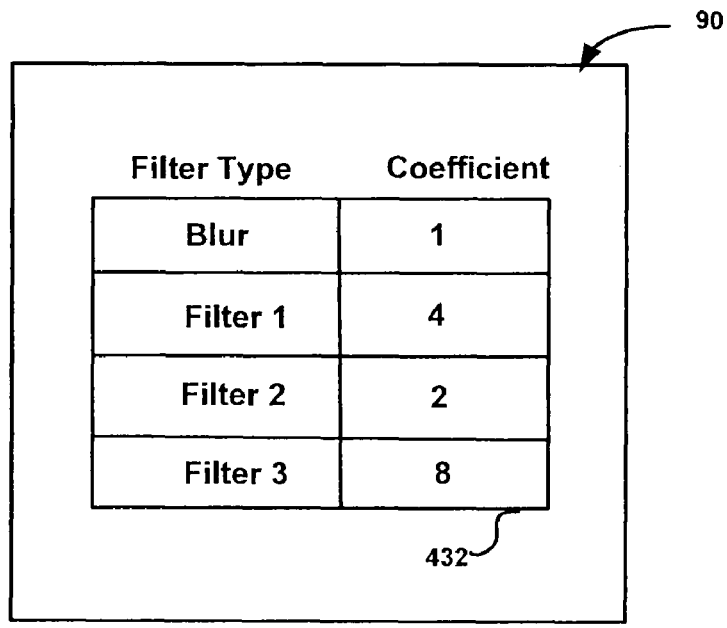
FIG. 6B illustrates a representation of the coefficient logic and exemplary values applicable to all cells in the filter pixel matrix stored in the registers for different filter types, in accordance with one embodiment of the present invention.

FIG. 6B illustrates the structure of the Coefficient Logic 90 in another embodiment. In this embodiment, the register 432 in the Coefficient Logic 90 keeps only one coefficient value for each types of filter types. The same value is applied to all pixels in the matrix.

Referring back to FIGS. 4D and 4E, as mentioned, the multiplication and division through shifting works most efficiently when the multiplier or divisor can be represented in $2^N$ form. Hence, the coefficient logic 90 of FIG. 6A is configured to provide coefficient values that can be represented in $2^N$ form, i.e., the coefficient values are configured to be 1, 2, 4, 8 and so on. However, in most practical cases, a coefficient value higher than 4 would cause the pixel to be too bright and will result in loss of detail. Hence, in most practical scenarios, coefficient values 1, 2, and 4 are most appropriate. As apparent, a coefficient value of 3 may not be set. However, not being able to use a coefficient value of 3 is not limiting in view of substantial advantages in providing faster calculations and simplified and efficient circuitry. Further, a coefficient value of 4 or 2 may be used instead. Since, the pixel values multiplied by the coefficient are averaged out, the end result of using either 2 or 4 instead of 3 is not significantly restrictive.

Figure 7:
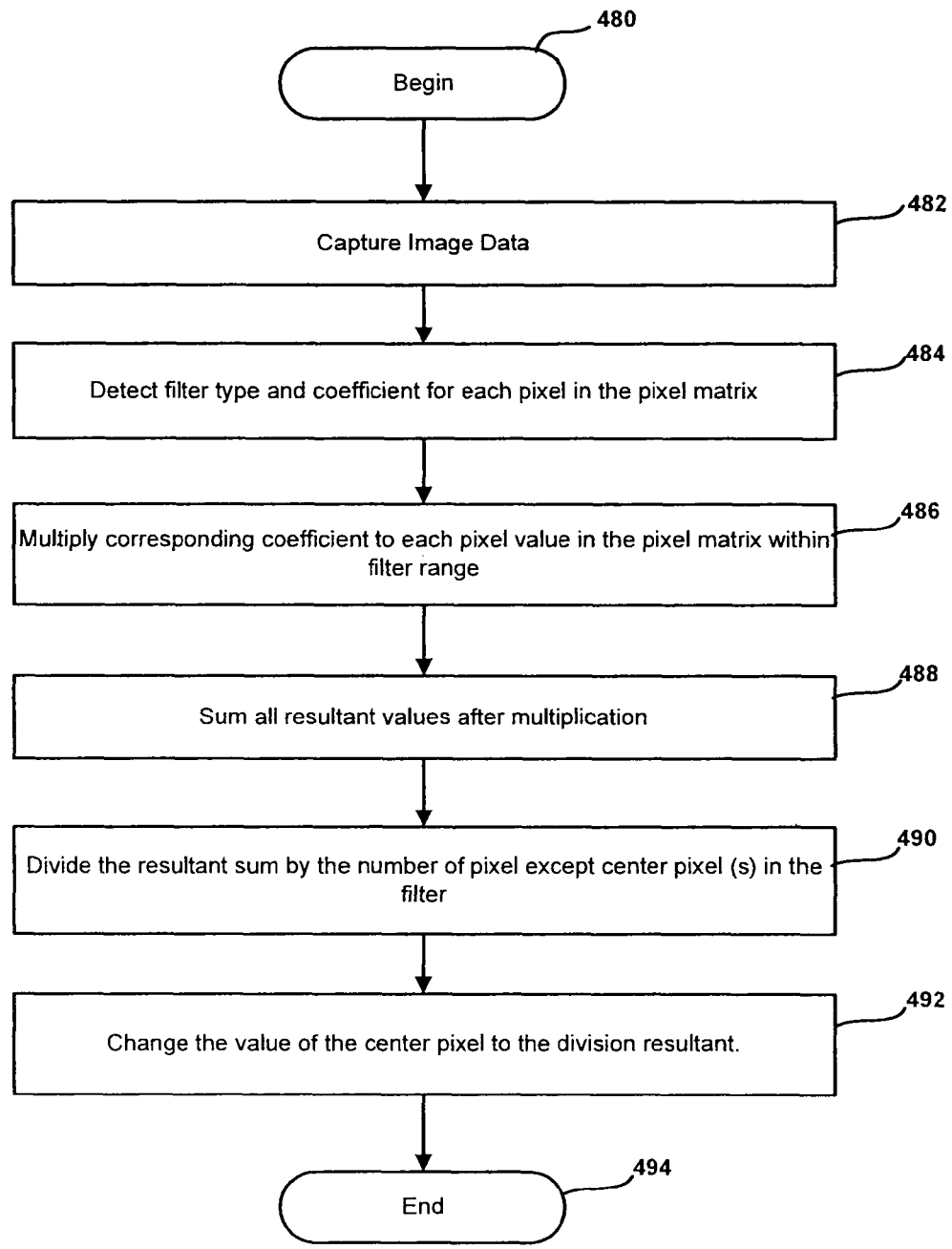
FIG. 7 illustrates a flow chart showing a method for providing image enhancement through a manipulation of the pixel values, in accordance with one embodiment of the present invention.

FIG. 7 illustrates a flow of control of the process of normalizing the center pixel by calculating an average and applying the average to the center pixel. The process of normalization begins in operation 480. In operation 482 the image data is captured from an image capturing device such as a camera. In one embodiment, the image data is stored in the memory 482 and accessed by the filter logic frame by frame. Based on selected filter type, the filter logic receives selected coefficient data for each pixel in the frame pixel matrix in operation 484. The coefficient values are applied to the respective pixels in the sub-matrix and a multiplication is calculated by multiplying a corresponding coefficient value with the pixel value for each pixel in the pixel matrix in operation 486. The sum of all resultant values after multiplication is calculated in operation 488. An average value is calculated by dividing the resultant sum by the number of pixels in the sub-matrix 490. As described earlier, in a sub-matrix with an even number of rows, a group of pixels may be marked as "center pixels." Finally, the value of center pixel or pixels is changed to this average value in operation 492. The process continues by selecting (or retrieving from the memory) a new sub-matrix N pixels to the right of the previous sub-matrix. The value of n can be selected based on desired fineness/granularity, speed, or combination thereof of the normalization process. A value of 1 for N would provide the highest fineness/granularity and the lowest speed of the normalization. A higher value would provide less fineness/granularity but a higher speed of normalization. Hence, an appropriate value may be selected based on available resources, speed considerations, type of filtering, etc.

When the end of the row in the frame is reached, a new pixel matrix is selected n pixels below the left most pixel matrix in the previous row. As described above, an appropriate value of n may be selected based on appropriate factors as described above. The process finally ends in operation 494 when the whole frame is normalized.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims

What is claimed is:

1. A method for efficiently applying a filter to image data, comprising using a processor to:
   (a) identify a filter having a filter size and defining coefficient values for each pixel in the image data;
   (b) select a sub-matrix in the image data, the sub-matrix having a plurality of pixels and the sub-matrix corresponds to the filter size, the plurality of pixels in the sub-matrix without a center pixel is a number that can be represented in a $2^N$ form;
   (c) receive a coefficient value for each of the plurality of pixels, the coefficient value represented in $2^M$ form is defined based on a filter type;
   (d) calculate an average value of multiplications of pixel values with corresponding coefficient values of each of the plurality of pixels, wherein a multiplication of a pixel value and corresponding coefficient value is calculated by shifting a binary representation of the pixel value M bits, and a division to calculate the average value is performed by shifting a binary representation of a sum of the multiplications N bits; and
   (e) apply the average value to a center pixel in the sub-matrix.

2. The method as recited in claim 1, wherein if the number of the plurality of pixels is not in the $2^N$ form, selectively removing one or more pixels from the plurality of pixels to enable a remaining number of a plurality of pixels to be capable of being represented in the $2^N$ form.

3. The method as recited in claim 2, further comprising selecting a new sub-matrix in the image data and repeating (c) to (e), and when an end of a row of the image data is reached, the new sub-matrix is selected from a beginning of the image data and one or more pixels below the previous sub-matrix.

4. The method as recited in claim 3, wherein the center pixel is any pixel in the sub-matrix, and a relative position of the center pixel is consistent in successive selection of the sub-matrix.

5. The method as recited in claim 1, wherein the center pixel is a group of adjacent pixels in the sub-matrix.

6. The method as recited in claim 1, further comprises identifying an edge region within the sub-matrix.

7. The method as recited in claim 6, further comprises selecting unfiltered data to avoid losing sharpness of the edge region.

8. The method as recited in claim 1, further comprising:
   swapping row numbers of rows above a center row in the sub-matrix with row numbers of rows below the center row, wherein the swapping enables processing pixel values of pixels in a peripheral region of the image data.

9. The method as recited in claim 1, further comprising:
   swapping column numbers of columns on a left side of a center column in the sub-matrix with column numbers of columns on a right side of the center column, wherein the swapping of the column numbers results in a first pixel in top left hand corner of the sub-matrix being the center pixel.

10. A filter circuit for filtering image data, comprising:
   a memory for storing a portion of the image data;
   coefficient logic configured to determine a filter coefficient to be applied to a reference pixel in a sub-matrix of the image data, the coefficient logic includes a register array to store a plurality of filter coefficients, the register array further includes data representing a filter type associated with each register in the register array, wherein the filter coefficients are numbers that can be represented in a $2^M$ form;
   First In First Out (FIFO) logic to retrieve portions of the image data from the memory; and
   filter logic configured to calculate an average of multiplications of pixel values and corresponding coefficients, the filter logic including sum logic to calculate a sum of numbers, multiplication logic to multiply a pixel value by a corresponding coefficient value through a bit shift operation, and division logic to divide the sum of numbers by a number of pixels in the sub-matrix, wherein the number of pixels in the sub-matrix being capable of being represented in a $2^N$ form.

11. The filter circuit of claim 10, wherein the filter logic further including logic to selectively remove one or more pixels from the sub-matrix, if the number of pixels in the sub-matrix without the center pixel is not represented in the $2^N$ form, so that the number of pixels in the sub-matrix without the center pixel is in the $2^N$ form.

12. The filter circuit of claim 11, wherein the selective removal includes removing pixels from bordering regions of the sub-matrix.

13. The filter circuit of claim 11, wherein the selective removal includes a combination of removing pixels from bordering regions and increasing a size of the center pixel.

14. The filter circuit of claim 10, wherein the filter logic is incorporated in a graphics processor.

15. A method of efficiently applying a filter to image data, comprising using a processor to:
   identify a filter having a filter size to filter the image data;
   reduce a number of pixel positions within the filter, the number of pixel positions selected from different concentric rings of the filter; and apply the filter with the reduced number of pixel positions to the image data, wherein the number of pixel positions is selected to reduce the filter size to a number that can be represented in a $2^N$ form to enable use of bit shift operations for multiplication and division.

16. The method as recited in claim 15, wherein the applying the filter includes, selecting a sub-matrix in the image data, the sub-matrix having a plurality of pixels;

receiving a coefficient value for each of the plurality of pixels;

calculating an average value of multiplication of pixel values of each of the plurality of pixels with the corresponding coefficient value of each of the plurality of pixels; and applying the average value of a center pixel in the sub-matrix.

17. The method as recited in claim 16, wherein the coefficient values are defined individually for a combination of each of the plurality of pixels and a filter type.

18. The method as recited in claim 16, wherein a same coefficient value is defined for all pixels in the plurality of pixels, for a filter type.

19. The method as recited in claim 15, further comprising:

swapping row numbers of rows above a center row in the sub-matrix with row numbers of rows below the center row, wherein the swapping enables processing pixel values of pixels in a peripheral region of the image data.

20. The method as recited in claim 16, wherein selecting the sub-matrix further comprises identifying an edge region within the sub-matrix.

* * * * *